United States Patent
Groezinger

[11] 3,834,353
[45] Sept. 10, 1974

[54] HAYSTACK FEEDER
[76] Inventor: Marlo W. Groezinger, Rt. 2, Freeport, Ill. 61032
[22] Filed: Nov. 12, 1973
[21] Appl. No.: 414,710

[52] U.S. Cl. .................................. 119/60, 160/135
[51] Int. Cl. .......................................... A01k 5/00
[58] Field of Search ........ 119/60, 20; 160/135, 229, 160/351

[56] References Cited
UNITED STATES PATENTS
| | | | |
|---|---|---|---|
| 2,835,223 | 5/1958 | Erickson | 119/20 |
| 3,067,723 | 12/1962 | Norwood | 119/60 X |
| 3,135,267 | 6/1964 | Liebig | 119/20 X |
| 3,336,908 | 8/1967 | Swanson | 119/60 |
| 3,651,851 | 3/1972 | Curtis | 119/20 X |

FOREIGN PATENTS OR APPLICATIONS
| | | | |
|---|---|---|---|
| 231,793 | 1/1961 | Australia | 119/20 |

Primary Examiner—Louis G. Mancene
Assistant Examiner—J. N. Eskovitz
Attorney, Agent, or Firm—Morsbach, Pillote & Muir

[57] ABSTRACT

Six panels are hinged together at adjacent ends to form a haystack feeder. The hinging allows the feeder to collapse inwardly into two triangular configurations as the cattle eat away the haystack.

10 Claims, 4 Drawing Figures

PATENTED SEP 10 1974      3,834,353

HAYSTACK FEEDER

BACKGROUND

The invention pertains to the art of animal husbandry and more particularly to hay feeding devices.

To greatly reduce the manpower required in haymaking, "loose-hay" systems have become increasingly utilized. These systems use machines which compress the hay slightly as it is picked up and blown on board for transport. The entire load from the stack wagon may be deposited for free-choice feeding. Recent studies show that free-choice feeding without a feeding rack can result in waste up to 50 percent. Such waste can change the lowest cost/ton system into the most expensive. However, if a large stack is enclosed by a rack or frame, livestock can reach only a portion of the stack. To overcome this deficiency, a collapsible feeding rack called "Stack-Mizer," has been developed by Zeitlow Co. of McPherson, Kansas. Four panels are hinged at their ends and enclose the stack in a rectangular configuration. As cattle eat away the stack, they also push the sides closer to maintain the stack in snug fit. In this manner, this feeder rack assumes a parallelogram. Another such device is shown in U.S. Pat. No. 3,336,908 issued Aug. 22, 1967 to J. J. Swanson. The disadvantage is that as the longer sides get closer together, the feeder rack becomes unstable and eventually falls over. It is desirable to provide a feeder rack in which the sides can collapse inwardly without making the rack unstable.

SUMMARY

The invention relates generally to a device to be utilized for forming stacks of hay and/or feeding said stacks to cattle. More particularly, the invention relates to a haystack feeder the sides of which easily move inwardly as cattle or the like eat the hay therein so that the entire stack is gradually fed to the animals without being unduly spread around and wasted.

The general object of the present invention to provide a new and improved haystack feeder.

Another object of the present invention is to provide a haystack feeder which greatly increases the accessibility of the hay to the animals.

Still another object of the invention is to provide a haystack feeder which minimizes waste.

It is a further object of the present invention to provide a haystack feeder in accordance with the foregoing objects in which the longitudinal sides may collapse inwardly to provide accessibility of the hay to the animals.

A still further object is to provide a haystack feeder in accordance with the foregoing object yet which is stable when in collapsed position.

Another object of the present invention is to provide a haystack feeder which is easily transportable.

These, and other objects and advantages of the present invention, will become apparent as the same becomes better understood from the following detailed description when taken in conjunction with the accompanying drawings.

DRAWINGS

DESCRIPTION

Figure 1:
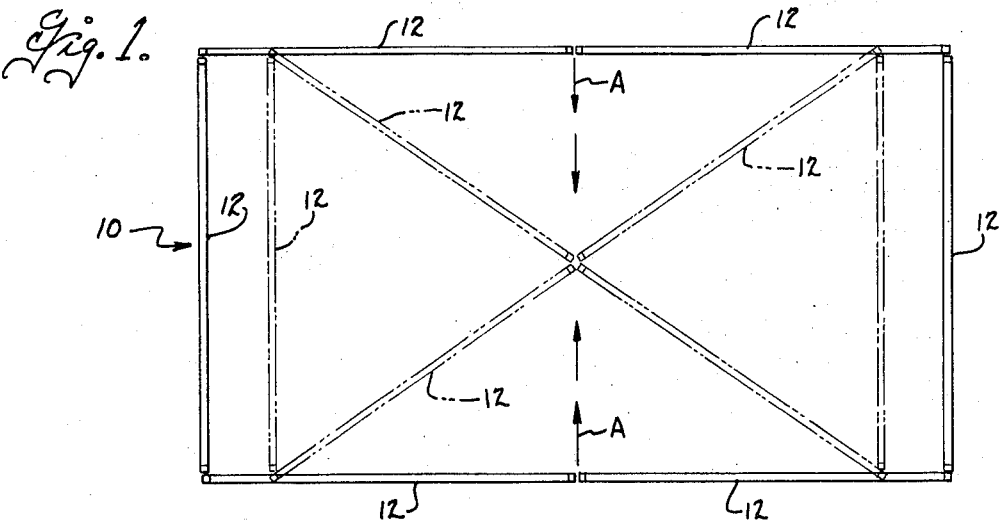
FIG. 1 is a top plan view of a haystack feeder in accordance with the present invention and showing the collapsed position in phantom lines.

Reference is now made more particularly to the drawings which illustrate the best presently known mode of carrying out the invention and wherein similar reference characters indicate the same parts throughout the several views.

In a preferred embodiment of the invention, a haystack feeder or enclosure, generally designated 10, is formed of six identical panels designated generally by the numeral 12. The panel 12 includes vertical end posts 14 and 15 which are interconnected by upper and lower rails 16 and 17, as well as intermediate rails 18 and 19. The upper and lower rails 16 and 17 are dog-legged as at 16a and 17a, to provide a cantilevered top end 14a and a cantilevered bottom end 14b on end post 14. These cantilevered ends serve a purpose which will hereinafter be explained. A plurality of slant bars 22 extend between the intermediate rails 18 and 19 to provide head receiving openings for the cattle. By being slanted, the bars 22 prevent the cattle from dragging hay out of the stack, while providing structural rigidity to the panel. Between rails 17 and 19 is a plate-like barrier 24 which retains the hay at the bottom of the panel and prevents it from being trampled under foot. A structural plate 26 conveniently interconnects rails 16 and 18.

In the preferred embodiment illustrated, the panel 12 is 9 feet in length and about 4½ feet tall. The structural members 14–19 are formed of 1¼ inch square tubing; while plates 24 and 26 are preferably formed of sheet metal and welded in place.

Figure 2:
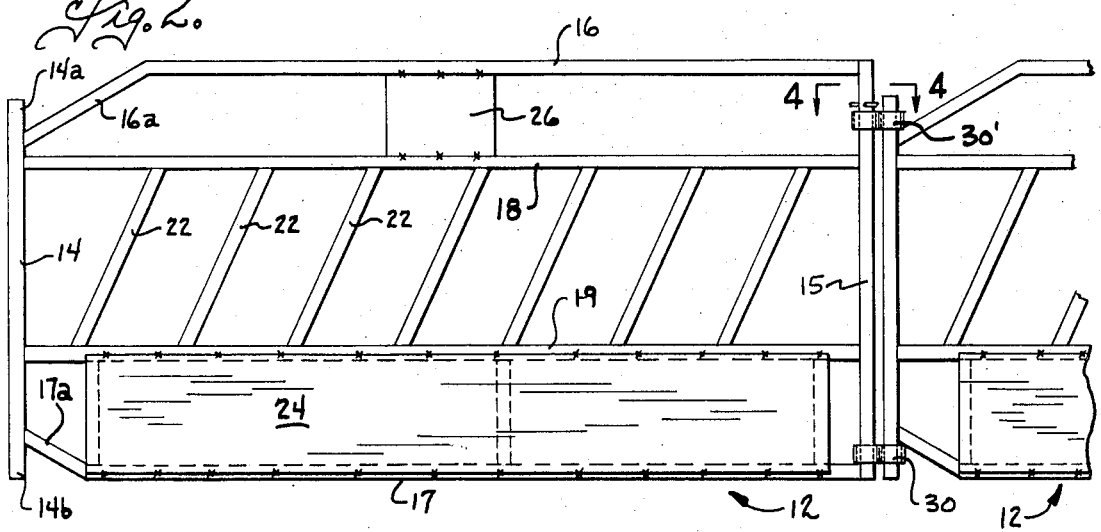
FIG. 2 is a front elevation of a preferred embodiment of a panel having a second panel hingedly connected thereto.

At the bottom of end member 15 is mounted a collar 30. Collar 30 is formed of two tubular portions 31, 32 which are welded together in the form of a figure eight. Thus the collar 30 has a cross-section in the shape of two continuous rings, one of which is circumjacent the end post 15 and can pivot therearound. Each tube advantageously is two inch diameter for this purpose. The lower cantilevered end 14b is received into the tube 32. As can be seen in FIG. 2, member 17a of an adjacent panel overlies and engages the top of tube 32; while the opposite end of lower rail 17 engages the bottom of tube 31.

Figures 3, 4:
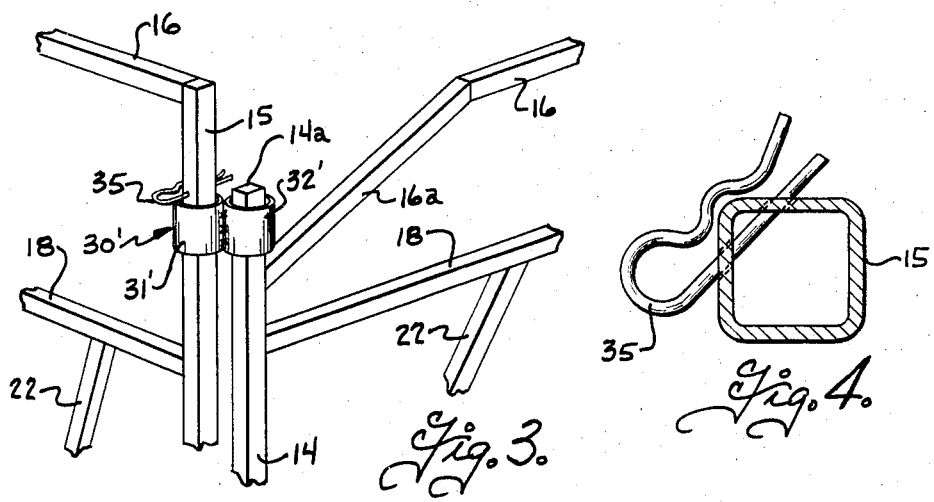
FIG. 3 is an enlarged fragmentary perspective view of two panels hingedly connected.
FIG. 4 is a cross-sectional view taken along line 4—4 of FIG. 2 and on an enlarged scale.

A similar collar 30' is mounted at the top of end post 15 and is slidable therealong between a raised position and the position shown in FIGS. 2 and 3 where tube 32' is circumjacent the cantilevered end 14a of an adjacent panel. Since it is slidably mounted, the collar 30' can easily be connected or disconnected from the adjacent end 14a. The dogleg 16a engages the underside of tube 32' to restrain downward movement of the collar 30'. A fastener in the form of a retention pin 35 advantageously shaped as shown in FIG. 4, cooperates with end post 15 and, in the embodiment shown, overlies tubular portion 31' to restrain upper movement of the collar.

It can be seen from the structure described, that identical panels may be hingedly interconnected to form an enclosure for a haystack. In the preferred embodiment, six such panels 12 are utilized to provide a generally rectangular haystack feeder 10. In this manner, the longitudinal sides are hinged at their mid points. As the cattle eat away the haystack, and push inwardly to reach the hay, the longitudinal sides collapse inwardly in the direction shown by arrows A in FIG. 1. As previously described, collapsible haystack feeders are known in the art; however, the prior feeders collapse into a parallelogram which ultimately becomes unstable and falls to the ground. In contrast, the collapsed position of the present invention is in the shape of two contiguous triangles which meet at their apex as shown in phantom lines in FIG. 1. In this manner, the enclosure is quite stable and will not fall down. Additionally, since the longitudinal sides are hinged in the middle, the span of each panel 12 is reduced and correspondingly smaller structural members may be utilized in its construction. The reduced length panels are also more readily transportable as by a pickup truck commonly used on a farm.

While a preferred embodiment of the invention has herein been illustrated and described, this has been done by way of illustration and not limitation, and the invention should not be limited except as required by the scope of the appended claims.

I claim:

1. A haystack feeder comprising six panels hingedly connected to provide an enclosure having two end panels and four side panels; each panel including first and second end posts, upper and lower members connecting said end posts and therewith providing a frame, and means carried by the frame and defining openings for receiving the heads of feeding animals; each first end post having a cantilevered end; and hinge means interconnecting each first end post with the second end post of the adjacent panel and arranged to allow each pair of side panels to swing inwardly so that the enclosure collapses generally into two triangular configurations, and the hinge means including a collar slidably mounted on the second end post and arranged to selectively receive the cantilevered end of the first end post of the adjacent panel in a hinged position, and means for releasably holding the cantilevered end and collar in said hinged position.

2. A haystack feeder as set forth in claim 1 wherein each first end post has cantilevered ends at both top and bottom; and there is a collar at both the top and bottom of each second end post.

3. A haystack feeder as set forth in claim 2 wherein each collar has a cross-section in the shape of two contiguous rings, each ring circumjacent one end post.

4. A haystack feeder as set forth in claim 3 wherein at least the second end post is square in cross-section, the means for releasably holding the cantilevered end and collar in said hinged position is in the form of a fastener releasably mounted on the second end post and overlying the collar at the top thereof.

5. A haystack former and feeder comprising: a plurality of panels connected to form an enclosure; each panel including
first and second end posts,
means interconnecting the end posts to provide structural rigidity to the panel and defining openings for the passage of heads of feeding animals,
the first end post having a cantilevered end at the top,
a collar slidably mounted on the second end post between a raised position and a position circumjacent the cantilevered end of the first end post of an adjacent panel to form a hinge connection therewith,
locking means for holding the collar in said circumjacent position, and
interfitting means at the bottom of the first and second end posts to form a hinge connection between adjacent panels.

6. The combination of claim 5 wherein the interfitting means includes a cantilevered end at the bottom of one end post and a collar on the other end post.

7. The combination of claim 5 wherein the enclosure is formed by six panels, and the hinges allow the panels to collapse into two triangular configurations.

8. A haystack feeder comprising six identical panels of equal length hingedly connected to provide a rectangular enclosure having two end panels and four side panels; each panel including first and second ends, upper and lower horizontal members, and a plurality of inclined bars extending between the upper and lower members and spaced apart to define canted openings for receiving the heads of feeding animals; and hinge means interconnecting each first end with the second end of the adjacent panel and constructed and arranged to allow each pair of side panels to swing inwardly so that the enclosure assumes the general shape of two equilateral triangular configurations.

9. A haystack feeder as set forth in claim 8 wherein the lower horizontal member is spaced above the bottom of the panel, and each panel includes means at the bottom below said lower horizontal member for retaining the hay within the enclosure.

10. A haystack feeder as set forth in claim 8 wherein each panel has an end post at each end, the upper and lower horizontal members extend between the end posts and therewith provide a frame, and the lower horizontal member is spaced above the bottom of the panel; and including a hay-retaining substantially imperforate barrier depending from the lower horizontal member to the bottom of the frame.

* * * * *